Aug. 19, 1941. J. H. JACOBSON Re. 21,880

ROAD JOINT

Original Filed Jan. 10, 1934 2 Sheets-Sheet 1

Inventor
James H. Jacobson
by Harry C. Wilkinson
Atty.

Inventor
James H. Jacobson
by Harold E. Eichelman
Atty.

Reissued Aug. 19, 1941

Re. 21,880

UNITED STATES PATENT OFFICE 21,880

ROAD JOINT

James H. Jacobson, Evanston, Ill., assignor to Cal C. Chambers and Robert S. Bradshaw, Jr., St. Louis, Mo., as joint tenants Original No. 2,138,817, dated December 6, 1938, Serial No. 706,081, January 10, 1934. Application for reissue May 17, 1940, Serial No. 335,834

21 Claims. (Cl. 94—18)

This invention relates to a method of transmitting road loads from an initially loaded slab or section of a roadway or the like to an adjacent slab or section.

The object of this invention is to provide means for transmitting road load crosswise or transversely of the slab sections and/or longitudinally or in the line of travel of the roadway; and To provide for transmitting road loads applied to one slab section to an adjacent slab section through the agency of an element which may provide part of a joint and seal between the slab sections; and To confine the free flexing or bending of the dowel bars embedded in the material of the roadway to the space between slab sections of the roadway and to prevent or reduce the bending or flexing of that portion of the bar which extends from that space into the slab section in order to thereby reduce disintegration of the material of the slab due to the action of the bars upon said material because of the road load applied to the bar; and To accomplish the last mentioned advantage through a means extending crosswise or longitudinally of said roadway and arranged at a face or an end of a slab; and To provide means for forming a support for an end of a slab section and the employment of this means to assist in accomplishing the prevention of the disintegrating action between the dowel and the material of the slab due to road load applied to the bar; and To provide means for forming a support for an end of a slab and a bond between the joint and slab, this means assisting to transmit road loads from one slab section to an adjacent section; and To provide means for sealing the space between the slab sections against the entrance of foreign material permanently allowing for the free and independent lateral movement of the slab sections occasioned by road load, moisture, temperature change or subgrade displacement; this means accomplishing the above mentioned transmission of road loads from one slab section to another; and In addition to sealing the space between said roadway sections, it is an object to employ the joint as a means of support for dowel bars employed in the roadway structure and thus limit the flexing of said bars and reduce the crushing action of said bars on the slab and the resultant coning of the material of the slab surrounding the bars due to the road load being applied to the bars.

The invention has these and other objects, all of which will be explained in detail and more readily understood when read in conjunction with the accompanying drawings (two sheets) which illustrate various means and the method of accomplishing the invention, it being understood that other arrangements may be resorted to without departing from the spirit of the appended claims forming a part hereof.

Figure 1:
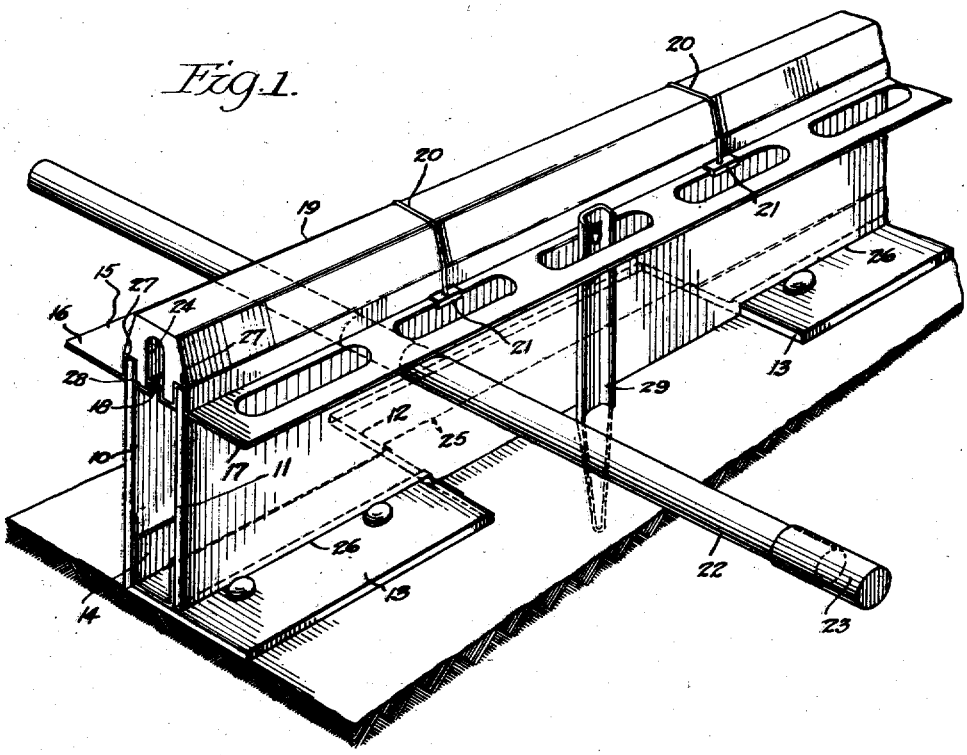
Fig. 1 is a perspective view of a joint embodying the invention.
Figure 2:
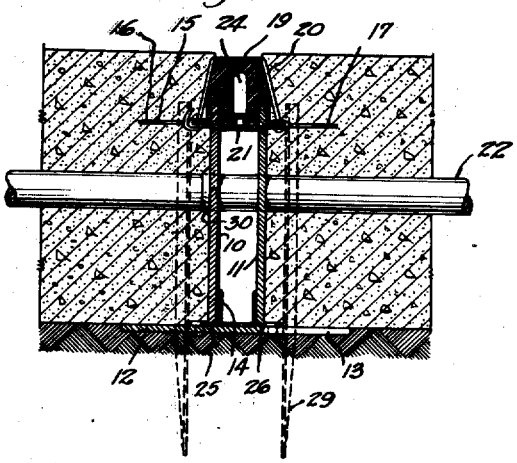
Fig. 2 is a vertical section through Fig. 1.
Figure 3:
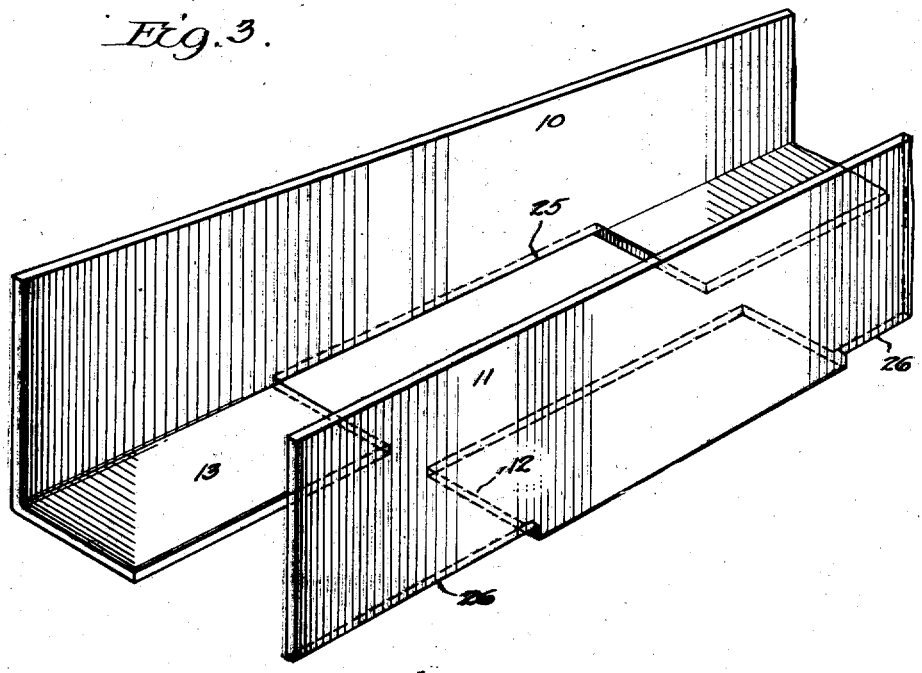
Fig. 3 is an isometric view of the facing angles only, spaced apart but in their relative positions.
Figure 4:
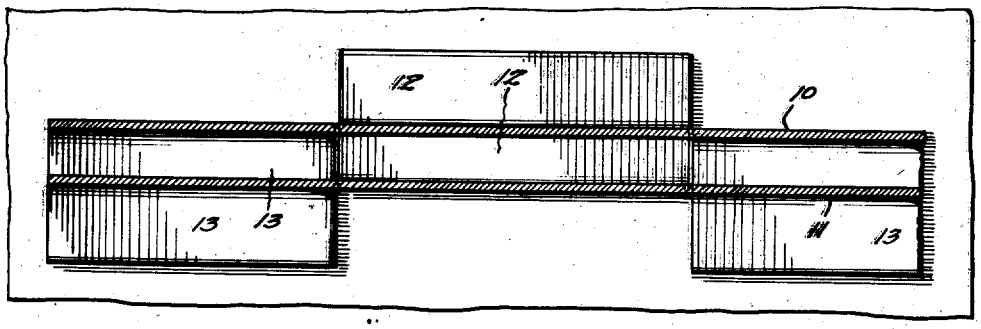
Fig. 4 is a plan of the base of the joint, the top of the vertical angles being cut away and the seal removed, to show the bearing on the subgrade and the transverse load distribution or beam action of the angles.

Road building has passed through many phases in practice and design. The modern road or highway of today is considered and dealt with as a structure, not just a ribbon of concrete. The new structures as now designed bring with them the elements of greater cost and greater permanency; preservation of investment; a definite salvage value; and the economic and safe handling of a greatly increased volume, weight and speed of traffic. Appearance is also as definitely an objective of highway design as are utility and safety.

A broad characteristic of the modern highway is the adoption of concrete for concrete pavement, and/or for the bases of brick and bituminous surfaces, and the provision of means providing for load distribution across the slab (transversely of the road) at this point; and the specific inclusion of means for permanently sealing this joint against the entrance of foreign matter allowing of the free and independent movement of the slab occasioned by load, moisture, temperature change or subgrade displacement.

My invention relates to design procedure as particularly applied to roadways involving the employment of artificially created joints and the use of separate slab sections.

These joints are points of weakness in the pavement, and consequently practically all pavement failures occur at transverse joints, because as a moving wheel load approaches a transverse joint it concentrates the load at the abutting edges of the divided slab and develops critical stresses in a pavement that otherwise would be strong enough to support the load without failure.

I am aware that mechanical joints have been produced and are now in use. However, joint failures still occur due to lack of adequate load transmission, due to improper design of the joint and/or lack of bearing or support of the dowel bars, the latter of which results in channeling or coning of the paving material of the slab because of the improper connection of the slab sections comprising the roadway.

It is the general practice to use dowel bars for purposes of load transmission as well as alignment, but the selection of bars as to length, cross section and spacing has been largely a matter of judgment; and Usually in computing the length of dowels, the dowels are figured for equal capacity in bending and bearing, without any allowance for contact with, or support from, any transverse steel. Increasing the length of a dowel beyond certain limits, increases its load carrying capacity in bearing, but reduces its capacity in bending.

It has been found with respect to load distribution and when a support is provided for the dowel bar at the top and bottom thereof, that this support increases the load carrying capacity of the dowel in bearing, particularly if the support is placed near the edge of the slab where the bearing pressure is greatest, this arrangement of support above and below the dowel bar being preferable because of reversal of load application under moving load.

The slab assumed to be subjected to the moving wheel load is herein referred to as the "initially loaded" slab, and the adjacent unloaded slab is defined as the "opposite" slab. Each slab edge abutting the transverse joint is denoted as the "face of the slab."

A mechanical device for sealing the space between adjacent ends of the slab sections and providing means for accomplishing the distribution of road loads contemplates the utilization of a pair of angle members, designated 10 and 11. The lateral flanges or feet of said angles are respectively designated 12 and 13, which feet engage the under side of said slab sections.

The vertical legs of the angles 10 and 11, are spaced from each other to provide for movement of the angles 10 and 11 and thus compensate for the lateral movement of the slab sections. These angles 10 and 11 are in the present instance partially held in spaced relation to each other through the agency of flexible spacers 14 at or near the base thereof. The upper end of the joint formed by the angles 10 and 11 is closed by a metallic seal 15, having the lateral flanges 16 and 17 which are adapted to be embedded in the aggregate forming the roadway. This last mentioned element is also provided with a longitudinal crimped portion or rib 18 to provide for the resultant compressive movement of the angle elements upon the expansion of the roadway sections. A bituminous cap or seal 19, is employed which forms a closure for the entire structure and is further utilized to assist in sealing the space between the respective roadway sections to prevent the infiltration of water, dirt, etc., into the space between the slab sections. This bituminous member extends lengthwise of the joint and is temporarily secured to the joint through the agency of the binders 20, which are passed through keys 21. The keys 21 extend through apertures provided in the respective vertical legs of the angles 10 and 11. The vertical legs of the angles 10 and 11 are further provided with a plurality of apertures for the reception of dowels 22 which are introduced to couple the ends of the respective slab sections to each other and transmit defined road loads from one slab section to another. Each of these dowels may be provided with a thimble 23 which will allow for movement of the dowels upon the lateral movement of the slab sections, and the dowels may be welded to alternate legs of the angles as shown at 30.

The load transmitting action resulting from the utilization of this structure causes material reduction in the flexing or bending of the dowel bars which thus reduces the channeling or coning of the concrete in the adjacent ends of the slab sections. It is also believed evident that the bending arm of these dowel bars is shortened and the bearing increased which also reduces channeling or coning of the material of the slab and which will further tend to confine the free action of the dowel bars to the space between the angles 10 and 11. The lateral flanges or feet 12 and 13 of the angles 10 and 11 also act to carry or distribute the load from the slabs to the vertical legs of the angles and thence to the dowel bars. The flanges or feet 12 and 13 and the vertical legs 10 and 11 of the angles further contribute to distribute the load transversely of the roadway, and in this manner will cause distribution of the load to the several dowel bars.

It will be noted that the sealing member 19 is formed to provide a downwardly facing, longitudinal channel 24, which tends to prevent extrusion of this material above the slab surfaces due to the lateral movement of the slab sections.

The specific structure illustrating the invention and comprising the two angular elements generally designated 10 and 11, the lower portion of each of which is formed to provide longitudinally spaced feet respectively designated 12 and 13, also has longitudinally spaced cut-out portions respectively designated 25 and 26. The cut-out portions of one foot are arranged opposite the foot of the other leg, and the foot pieces are designed to be arranged in the cut-out portions. In this manner the road load applied to the dowel bars 22 is transmitted from the leg 10 to the leg 11, and/or from the leg 11 to the leg 10.

The metallic seal 15 employed is provided with lateral flanges 16 and 17, which are formed as at 27 to cap the upper extremity of the walls respectively designated 10 and 11, and is additionally formed to provide a bridge piece which extends across said walls. This bridge is provided with a longitudinal, centrally disposed rib 18, which will compensate for the movement of the walls 10 and 11 as before described. One of the walls of the rib 18 also forms a portion of one wall of the channel 24, the latter being provided for the reception of a part 28 of the bituminous element 19, the latter being provided with a shoulder which limits the movement of the bituminous element or cap.

A conventional type of supporting stake 29 is shown for maintaining the joint in proper relation during the pouring of the roadway.

From the foregoing explanation of the structure involved it is believed evident that a new and novel means is provided for transmitting road load as it is applied to one slab section and thence transferred to the other slab section through the medium of a device forming a joint between the respective slab sections. It is further believed manifest that the structure provides means for increasing the load carrying capacity of the dowel in bearing, and thus limits and prevents to a degree, the free bending of the dowel within the slab section which will then prevent channeling or coning of the material of the roadway at the joint due to road loads applied to the dowel.

Having thus described my invention, what I claim as new and desire to cover by Letters Patent is:

1. An expansion joint for concrete roads and the like adapted to close the space between adjacent slab sections and comprising the combination of a stool and a seal capping an edge thereof with means for transmitting the applied load from one section to the next adjoining, the stool consisting of a pair of spaced members each having a wall abutting the ends of their respective slab sections, and each having a plurality of longitudinally spaced feet, the feet of one member being located in the space between the feet of the other member and said feet extending under and forming a bearing for the oppositely disposed member, and a member penetrating said slab sections and extending across the space between said sections and having bearing in each of said walls of the stool.

2. In a joint for concrete roads and the like adapted to seal the space intervening between adjacent slab sections, means for distributing the applied load transversely of the slab and also transmitting this load from one slab section to the next adjoining, said load transfer means consisting of a pair of spaced angles having upstanding legs which abut the ends of their respective slab sections, the angles facing each other and alternately the foot of one being cut out at intervals so that the remaining foot section of the other extends beyond and under the leg of the oppositely spaced angle and across the space intervening between the slab sections and into functionally operative engagement with the underside of the oppositely disposed slab section, thereby providing a bearing for the leg of the opposite angle, and a plurality of dowel bars spaced across the joint and engaging the adjacent slab sections and extending across the space therebetween, said dowel bars being affixed to one leg of the opposite angle, whereby a portion of the applied load is carried by the dowel bar into the leg of each angle and distributed to the foot of each angle at more than two points.

3. In a joint for concrete roads and the like adapted to seal the space intervening between adjacent slab sections, means for distributing the applied load transversely of the slab and then transmitting the applied load from one slab section to the next adjoining, said means consisting of a pair of facing angles extending substantially the length of the joint, the upstanding legs of each angle abutting the ends of their respective slab sections, the legs of each angle having a plurality of spaced feet extending therefrom toward the opposite angle and across the space between the slab sections, the leg of each angle providing a bearing for the top of the foot of the oppositely spaced angle, and a dowel member engaging both slab sections and extending across the space therebetween, said dowel having a bearing in each of the upstanding legs of the facing angles, said dowel member transmitting a portion of the applied load to the leg of each angle for distribution to the foot of the opposite angle and further providing means offering resistance to the rotation of the slab ends about the joint as an axis.

4. A bearing for dowel bars comprising a pair of spaced angles facing the ends of adjoining slab sections, the foot of each angle being cut out at intervals in staggered relation, the remaining foot sections alternately passing under and forming a bearing for the leg of the oppositely disposed angle, and a dowel bar spanning the space between the angles and having bearing in the leg of each facing angle so that a portion of the applied load is distributed transversely of the slab on the facing angle and then carried across the space intervening between the facing angles and distributed to the feet of the angles both at the heel and at a point intermediate the toe and heel thereof, thereby accomplishing the distribution of the load to the feet of the angles and across the space intervening between the spaced facing angles.

5. A bearing for dowel bars comprising a pair of spaced facing angles, the foot of each angle being cut out at intervals, the remaining foot section passing under and forming a bearing for the leg of the oppositely disposed angle, and a dowel bar spanning the space between and having bearing in the leg of each facing angle, so that a portion of the applied load is distributed along the leg of the angle and then carried across the space intervening between the facing angles and distributed by the leg of one angle to the feet of the opposed angle, the feet of each angle being reinforced against cantilever action by the leg of the opposing angle.

6. In a joint for concrete roads and the like adapted to seal the space intervening between adjacent slab sections, means for distributing the applied load transversely of the slab and then transmitting the applied load from one slab section to the next adjoining, said means consisting of a pair of facing angles extending substantially the length of the joint the upstanding legs of each angle abutting the ends of their respective slab sections, a seal extending across the upper ends of said upstanding legs, the legs of each angle having a plurality of spaced feet extending therefrom toward the opposite angle and across the space between the slab sections, the leg of each angle providing a bearing for the top of the foot of the oppositely spaced angle, and a dowel engaging both slab sections and extending across the space therebetween, said dowel having a bearing in each of the upstanding legs of the facing angles, said dowel transmitting a portion of the applied load to the leg of each angle for distribution to the foot of the opposite angle and providing means offering resistance to the rotation of the slab ends about the joint as an axis.

7. In a joint for concrete roads and the like adapted to seal the space intervening between adjacent slab sections, means for distributing the applied load transversely of the slab and then transmitting the applied load from one slab section to the next adjoining, said means consisting of a pair of facing angles extending substantially the length of the joint, the upstanding legs of each angle abutting the ends of their respective slab sections, a flexible metallic seal engaging and extending across the upper ends of said upstanding legs, said seal having means adapted to be anchored in the respective slab sections, the leg of each angle having a plurality of spaced feet extending therefrom toward the opposite angle and across the space betweeen the slab sections, the leg of each angle providing a bearing for the top of the foot of the oppositely spaced angle and a dowel engaging both slab sections and extending across the space therebetween, said dowel having a bearing in each of the upstanding legs of the facing angles, said dowel transmitting a portion of the applied load to the leg of each angle for distribution to the foot of the opposite angle and further providing means offering resistance to the rotation of the slab ends about the joint as an axis.

8. In a joint for concrete roads and the like adapted to seal the space intervening between adjacent slab sections, means for distributing the applied load transversely of the slab and then transmitting the applied load from one slab section to the next adjoining, said means consisting of a pair of facing angles extending substantially the length of the joint the upstanding legs of each angle abutting the ends of their respective slab sections, a flexible metallic seal extending across the upper ends of said upstanding legs, said seal having means respectively providing members for anchoring said seal to the respective slab sections, and a bituminous filler arranged above said seal, the legs of each angle having a plurality of spaced feet extending therefrom toward the opposite angle and across the space between the slab sections, the leg of each angle providing a bearing for the top of the foot of the oppositely spaced angle, and a dowel engaging both slab sections and extending across the space therebetween, said dowel having a bearing in each of the upstanding legs of the facing angles, said dowel transmitting a portion of the applied load to the leg of each angle for distribution to the foot of the opposite angle and further providing means offering resistance to the rotation of the slab ends about the joint as an axis.

9. In a joint for concrete roads and the like adapted to seal the space intervening between adjacent slab sections, means for distributing the applied load transversely of the slab and then transmitting the applied load from one slab section to the next adjoining, said means consisting of a pair of facing angles extending substantially the length of the joint the upstanding legs of each angle abutting the ends of their respective slab sections, and yieldable means located between said upstanding legs to maintain said legs in spaced relation to each other during the pouring of the concrete slabs, the legs of each angle having a plurality of spaced feet extending therefrom toward the opposite angle and across the space between the slab sections, the leg of each angle providing a bearing for the top of the foot of the oppositely spaced angle, and a member engaging both slab sections and extending across the space therebetween, said member having a bearing in each of the upstanding legs of the facing angles, said member transmitting a portion of the applied load to the foot of the opposite angle and further providing means offering resistance to the rotation of the slab ends about the joint as an axis.

10. In a joint for concrete roads and the like adapted to seal the space intervening between adjacent slab sections, means for distributing the applied load transversely of the slab and then transmitting the applied load from one slab section to the next adjoining, said means consisting of a pair of facing angles extending substantially the length of the joint the upstanding legs of each angle abutting the ends of their respective slab sections, and a plurality of yieldable means located adjacent to both the upper and lower extremities of said upstanding legs to maintain said legs in spaced relation to each other during the pouring of the concrete slabs, the legs of each angle having a plurality of spaced feet extending therefrom toward the opposite angle and across the space between the slab sections, the leg of each angle providing a bearing for the top of the foot of the oppositely spaced angle, and a member engaging both slab sections and extending across the space therebetween, said member transmitting a portion of the applied load to the leg of each angle for distribution to the foot of the opposite angle and further providing means offering resistance to the rotation of the slab ends about the joint as an axis.

11. In a joint of the character described for concrete structures, a stiff structural girder, and dowels or anchor elements rigidly and permanently secured thereto and projecting laterally therefrom and adapted to project into and move within an adjacent concrete section, during contraction and expansion of said section.

12. In a joint of the character described for concrete structures, a stiff structural girder, dowels or anchor elements rigidly and permanently secured thereto and projecting laterally therefrom and adapted to project into and move within an adjacent concrete section, during contraction and expansion of said section, and laterally compressible means co-operating with said girder and disposed in a space between the proximate faces of adjacent concrete sections.

13. In a joint of the character described for concrete structures, a stiff structural girder, dowels or anchor elements rigidly and permanently secured thereto and projecting laterally therefrom and adapted to project into and move within an adjacent concrete section, during contraction and expansion of said section, and laterally compressible means co-operating with said girder, disposed within and closing a space between the proximate faces of adjacent concrete sections.

14. In a joint of the character described for concrete structures, a stiff structural girder, anchoring dowels rigidly and permanently secured thereto and projecting laterally therefrom and adapted to project into and move within an adjacent concrete section during contraction and expansion, said sections being spaced, and an inverted flexible substantially U shaped element within and adjacent the top of the space between said sections.

15. In a joint of the character described for concrete structures, a stiff structural girder, anchoring dowels rigidly and permanently secured thereto and projecting laterally therefrom and adapted to project into and move within an adjacent concrete section during contraction and expansion, said sections being spaced, and a flexible substantially U shaped element within and adjacent the bottom of the space between said sections.

16. In a joint of the character described for concrete structures, a stiff structural girder, anchoring dowels rigidly and permanently secured thereto and projecting laterally therefrom and adapted to project into and move within an adjacent concrete section during contraction and expansion, said sections being spaced, a flexible element extending across the top of the space between said sections to form a closure therefor, and a flexible element forming a closure for the bottom of said space.

17. A bearing for dowel bars comprising a pair of spaced facing angles, each having a vertically disposed leg terminating in an angularly disposed foot, the foot of each angle passing under and forming a bearing for a portion of the leg of the companion angle, and a dowel bar for spanning the space between and having bearing in the leg of each facing angle so that load applied to either angle is distributed through the foot of the opposing angle, and wherein the foot of each angle is reinforced against cantilever action by the leg of the opposing angle.

18. A load transfer device for use in association with adjoining concrete slabs comprising a pair of spaced facing angle shaped members each having a vertically disposed leg anchored to the related slab and terminating in an angularly disposed foot, the feet of the respective angle shaped members extending oppositely and spanning the gap between the adjoining slabs and each foot passing under and forming a bearing for a portion of the leg of the oppositely disposed angle shaped member so that a portion of the load applied to either leg is imparted to the foot of the opposite angle shaped member, and means for anchoring each angle shaped member to its related slab.

19. A device of the character described for bridging the joint gap between road slabs, comprising a pair of opposing spaced angles facing one another and each having a vertically disposed leg adapted to engage the joint face of an associated road slab and each leg provided at a relatively low level with an angularly disposed foot of less width than the length of the connected leg, the oppositely extending feet lying in staggered relation to one another and each foot passing beyond and forming a bearing for a portion of the leg of the companion angle, and means engaging the legs at a relatively high level for spanning the gap between the legs and extending in each direction therebeyond in position to enter through the joint faces and into the bodies of the road slabs, so that load applied to either angle is distributed through the foot of the opposing angle.

20. A device of the character described for bridging the joint gap between road slabs, comprising a pair of opposing spaced angles formed of plate material facing one another and each having a vertically disposed leg adapted to engage flatwise against the joint face of an associated road slab and each leg provided at its base with an angularly disposed foot of less width than the length of the connected leg, the oppositely extending feet lying in staggered relation to one another and each foot passing under and beyond and forming a bearing for a portion of the leg of the companion angle, and means engaging the legs at a substantial distance above the feet for spanning the gap between the legs and extending in each direction therebeyond in position to enter through the joint faces into the bodies of the road slabs, so that load applied to either angle is distributed through the foot of the opposing angle.

21. A device of the character described for bridging the joint gap between road slabs, comprising a pair of opposing spaced angles facing one another and each having a vertically disposed leg adapted to engage the joint face of an associated road slab and each leg provided at a relatively low level with an angularly disposed foot so configured as to expose a portion of the connected leg to afford a contact surface for the foot of the opposed angle, the oppositely extending feet lying in staggered relation to one another and each foot passing beyond and forming a bearing for the contact portion of the leg of the companion angle, and means engaging the legs at a relatively high level for spanning the gap between the legs and extending in each direction therebeyond in position to enter through the joint faces and into the bodies of the load slabs, so that load applied to either angle is distributed through the foot of the opposing angle.

JAMES H. JACOBSON.